Patented Oct. 10, 1944

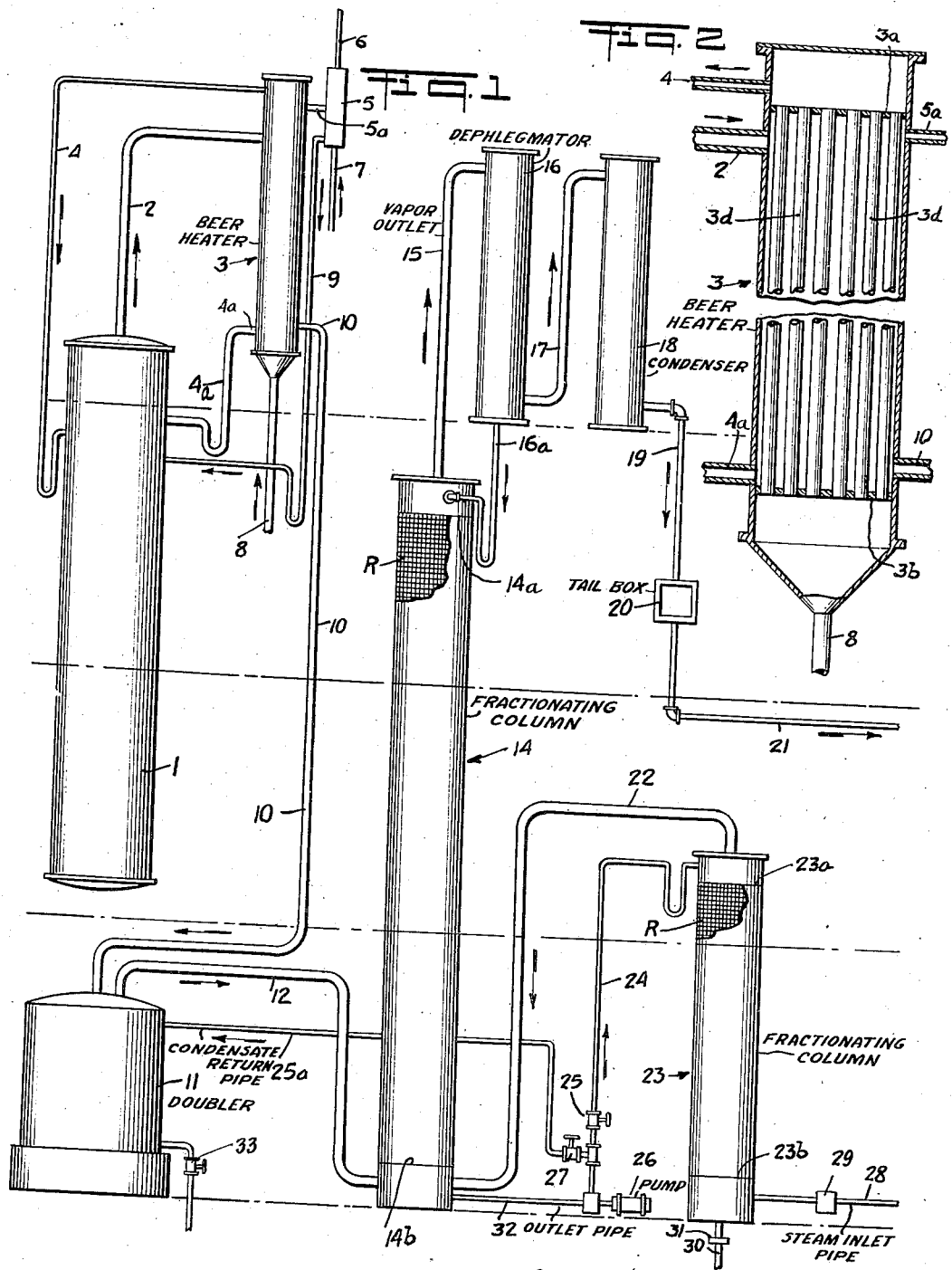

2,359,860

UNITED STATES PATENT OFFICE 2,359,860

PRODUCTION OF HIGH-PROOF ALCOHOL

Carl J. Kiefer and Edward S. Monohan, Cincinnati, Ohio, assignors to Schenley Distillers Corporation, New York, N. Y., a corporation of Delaware Application October 9, 1942, Serial No. 461,496

6 Claims. (Cl. 202—40)

Our invention relates to a new and improved system, including an improved method and arrangement of well-known apparatus, for directly and continuously producing ethyl alcohol of 190 proof or more, from the beer or wash. This grade of ethyl alcohol is very important in making munitions, butadiene, anti-freeze liquids, and for many other industrial purposes.

One of the important objects of our invention is to make it possible to convert plants which have hitherto been used for distilling whiskey and other spirits, of 120-140 proof, into plants which can produce said high proof alcohol. This can be done by utilizing the apparatus now found in such distilleries, and one or more fractionating columns of the filled or packed type. Such fractionating columns can be easily and cheaply made without the use of critical materials such as copper, tin and steel. In such packed columns, we can use the well-known Raschig rings which are made of brick-tile or clay. The shells of such fractionating columns can be made of suitable non-metallic material. We thereby avoid the necessity of using the much more expensive type of fractionating column which has separated plates with bubble caps.

In order to meet the present needs for such high-proof alcohol, it is necessary to convert approximately one hundred spirit distilleries. According to our invention, we can lower the cost of such conversion from about $1,500,000.00 to approximately $300,000.00–$400,000.00, in addition to saving time and eliminating the use of critical materials.

The invention described herein, if patented, may be freely manufactured and sold and used by or for the Government of the United States of America, or by any member of the public in the United States of America.

Other objects of our invention will be stated in the annexed description and diagrammatic drawing.

Fig. 1 is a diagrammatic view of the layout of the improved system.

Fig. 2 is a sectional view of the beer heater.

The cold beer or cold wash is pumped upwardly from the beer well, by means of a suitable pump (not shown) through a vertical pipe 8, and into the bottom space of the beer heater 3. This beer heater 3 is of conventional type. It is provided with a bottom perforated header 3b and with a top perforated header 3a. Vertically aligned perforations of said headers 3a and 3b are connected by the pipes 3d in the usual manner. The beer flows from the bottom space of the beer heater 3, upwardly through said pipes 3d, into the top space of said beer heater 3, and through the outlet pipe 4 into the beer still 1. Said beer still 1 is heated in the usual manner. The vapors which are generated by the heating of the beer in said beer still 1 pass out of the beer still 1 through the pipe 2 into the space of the beer heater 3 which is located between said headers 3a and 3b.

Some of the less volatile constituents of said vapor are condensed above the bottom header 3b in the usual manner, and said condensed vapors are returned to the still 1 by the pipe 4a. Water vapor and the more volatile vapors, including the vapors of the ethyl alcohol and the fusel oil, pass out of said space of the beer heater through the pipe 10, into the doubler 11. This doubler 11 is heated in the usual manner, so that the vapors which are condensed in said doubler are redistilled. The vapors which do not condense in said doubler and the vapors which are generated in said doubler 11 pass out through the pipe 12 into the bottom space of the main fractionating column 14, which is of the packed or filled type. We preferably use Raschig rings R which are located between a top perforated plate 14a and a bottom perforated plate 14b. The pipe 12 communicates with the bottom space of said main fractionating column 14, which is located below the bottom perforated plate 14b. The main fractionating column 14 is unheated. The heated vapors which pass upwardly through said main fractionating column 14 maintain said main fractionating column 14 at a temperature of about 180° F. The vapors pass out of said main fractionating column 14 through the pipe 15 into a conventional dephlegmator 16, which has the usual return pipe 16a for returning the less volatile condensed constituents to the top space of the main fractionating column 14, above the top perforated plate 14a.

The beed still 1 is maintained at a temperature of about 205° F., and the doubler is maintained at temperatures of about 200° F. to 215° F.

About 75% of the vapors which enter the dephlegmator 16 are condensed and returned to the main fractionating column 14 through pipe 16a, so that the ascending vapors in said main fractionating column 14 continuously and intimately contact with the descending liquid in the usual manner. Said descending liquid has a large percentage of ethyl alcohol.

The portion of the ethyl alcohol which passes out of the dephlegmator 16, in vapor form, passes through the pipe 17 into the condenser 18. The liquid ethyl alcohol of the aforesaid high proof is withdrawn from the condenser 18 through the pipe 19, into the tail box 20, which has the outlet pipe 21.

The remnants of the ethyl alcohol and other alcohols and the fusel oil and water, which would otherwise accumulate in the bottom space of the main fractionating column 14, are pumped out of said bottom space through the pipe 32, by means of the pump 26. The pump 26 forces the mixture of said alcohol remnants and the water and fusel oil and other high-boiling ingredients of the beer through the pipe 24, into the top space of the auxiliary packed column 23. This auxiliary packed column 23 is also preferably packed with Raschig rings R between the top perforated plate 23a and the bottom perforated plate 23b. The bottom space of the auxiliary packed column 23, below the bottom perforated plate 23b, is supplied with steam through a steam inlet pipe 28 which has a conventional control valve 29 for regulating the pressure of the steam which is supplied to said bottom space of the auxiliary packed column 23. The steam passes upwardly through the liquid which descends in the auxiliary packed column 23, thus vaporizing all of the remaining ethyl alcohol, in order to separate the same from the other liquid ingredients which descend in column 23. This vaporized ethyl alcohol is returned through the pipe 22, into the bottom space of the main packed column 14, below the bottom perforated plate 14b. The pipe 24 is provided with a hand-operated valve 25. A branch pipe 25a, which has a hand-operated control valve 27, connects the pump 26 to the doubler 11.

The vapor-receiving space of the beer heater 3 is connected by the pipe 5a to the vent condenser 5, which has an outlet 6 for carbon dioxide, air and the like. This condenser 5 is of the conventional type, and it is provided with a cold water inlet pipe 7 and with a return pipe 9 which leads the condensed alcohol vapors back to the beer still 1.

With the exception of the fractionating columns 14 and 23, all the apparatus above mentioned is now in use by spirit distilleries, so that no further description thereof is required.

During the run, the valve 25 is open and valve 27 is closed. The pump 26 then prevents any undesirable accumulation of water and fusel oil and other high-boiling ingredients in the bottom space of the main fractionating column 14 because the same are continuously pumped into the top of auxiliary packed column 23. The bottom space of said auxiliary packed column 23 is also provided with an outlet pipe 30, which has a hand-controlled valve 31, so that the liquid can be withdrawn from said bottom space as desired, and led to a sewer or any other convenient outlet. This can be done without any loss of ethyl alcohol, because said ethyl alcohol is continuously vaporized by the steam which is admitted through the pipe 28. Since the temperature of the auxiliary fractionating column 23 is maintained at about 190° F., or about 88° C., said temperature is below the boiling point of water, normal amyl alcohol, normal propyl alcohol and normal butyl alcohol, and other ingredients of fusel oil. It is preferred to remove only excess water through pipe 30 during the run, without removing the fusel oil. At the end of a run, any liquid which is accumulated at the bottom of column 23 can be removed through pipe 30.

In a continuous run, the volume of the fusel oil which is thus separated from the ethyl alcohol in the column 23 may amount to as much as 12 gallons per day. Any excess of water, which would otherwise overfill the bottom space of the column 14 or the bottom space of the auxiliary column 23, can thus be easily discharged through the outlet pipe 30, either continuously or intermittently.

At the end of a run, the valve 25 can be closed and the valve 27 can be opened. The pump 26 is then operated to drain the bottom space of the column 14 of any liquid, by pumping said liquid through the branch line 25a into the double 11. Such liquid may be heated in the double 11, prior to starting the next run, so as to vaporize only the ethyl alcohol therein, so that the separated ethyl alcohol, in vapor form, can be led through column 14 and condensed in condenser 18. The water and fusel oil remaining in the doubler 11 are drained through the valved pipe 33, before starting the next run.

Practical tests have shown that the system disclosed herein can be operated continuously in a typical run so as to distill 48,000 gallons of beer per 14 hours, producing 3,000 gallons of ethyl alcohol of 190 proof.

The pump 26 is preferably operated continuously during the run while valve 25 is open and valve 27 is closed, in order to pump liquid continuously from the bottom space of column 14 through pipe 24 during the run, into the top space of column 23. The vapor or vapors which enter column 14 through pipe 22, pass upwardly through column 14, together with the vapor or vapors which enter column 14 through pipe 12, because the bottom space of column 14, below perforated plate 14b, is kept substantially clear of liquid during the run. The doubler 11 can be designated as a still, for the purpose of the claims.

We have described a preferred embodiment of our invention, but it is clear that numerous changes and omissions can be made without departing from its spirit.

We claim:

1. Apparatus for producing high-proof ethyl alcohol from a low-proof wash which contains fusel oil, said apparatus comprising a still which is heated to vaporize the liquid ingredients of said wash, a main packed fractionating column which has a bottom space which is free from packing, an auxiliary packed column which has a bottom space which is free from packing, a pipe which connects the vapor space of said still to said bottom space of said main packed fractionating column, said main packed fractionating column being connected above the packing thereof to a dephlegmator in which the vapors which enter said dephlegmator are substantially condensed with the exception of a portion of the ethyl alcohol vapor and a portion of the water vapor, said dephlegmator being connected by a return pipe to said main fractionating column above the top of its packing to return to said main fractionating column the condensed water and fusel oil and the ethyl alcohol which have been condensed in said dephlegmator, said dephlegmator being also connected to a condenser in which the uncondensed portion of the vapor of the ethyl alcohol and of the water vapor is condensed, the temperature of the dephlegmator being regulated so that the mixture of vapors which is supplied to said condensor condenses therein to form ethyl alcohol of at least 190 proof, said condenser having an outlet for said high-proof condensed ethyl alcohol, a pipe-line which connects said bottom space of the main fractionating column to the said auxiliary packed column above the top of the packing thereof, pump means for pumping liquid from said bottom space of said main fractionating column through said pipe-line into said auxiliary packed column, means for admitting steam into said bottom space of said auxiliary packed column, said auxiliary packed column having an outlet for liquid at the bottom thereof, and also having a vapor-return pipe which connects said auxiliary packed column above the top of its packing to said bottom space of said main packed fractionating column.

2. Apparatus according to claim 1, in which said bottom space of said main packed fractionating column is also connected to said still by an auxiliary valve-controlled pipe-line.

3. A method of producing ethyl alcohol of at least about 190 proof from a low-proof wash which contains ethyl alcohol and water and fusel oil, which consists in heating said wash to vaporize said ethyl alcohol and water and fusel oil, passing the mixed vapors of said ethyl alcohol and water and fusel oil upwardly through and out of a main packed fractionating column, said mixed vapors entering said main packed fractionating column below the packing thereof, condensing a part of said water vapor and substantially all of the vapor of the fusel oil and a part of said ethyl alcohol vapor externally of said main packed fractionating column to provide a liquid condensate which is returned to said main packed fractionating column above the point where said mixed vapors enter said main packed fractionating column, said mixed vapors being cooled in said main packed fractionating column below their inlet temperature, the liquid condensate which is thus returned, descending in said main packed fractionating column in contact with said ascending vapors in said main packed fractionating column, separately condensing and collecting the fraction of said water vapor and the fraction of said ethyl alcohol vapor which are kept out of said main fractionating column, said mixed vapors which pass out of said main packed column being fractionally condensed external to said main packed fractionating column so that said separately condensed and separately collected fraction is ethyl alcohol of at least 190 proof, pumping excess condensed liquid out of said main packed fractionating column from a point below the packing thereof into an auxiliary packed fractionating column and above the bottom of said auxiliary packed fractionating column so that said pumped excess condensed liquid descends in said auxiliary packed fractionating column, passing steam upwardly through said auxiliary packed fractionating column to heat said descending liquid to a temperature between 78.4° C. and 100° C., in order to vaporize the ethyl alcohol in said liquid and without substantially vaporizing the water and the fusel oil of said liquid, returning said vaporized ethyl alcohol to said main packed fractionating column below the packing thereof, to ascend in said main packed fractionating column.

4. A method according to claim 3, in which both said packed columns are maintained at an average temperature which is between substantially 78.4° C. and 88° C.

5. A method according to claim 3, in which excess condensed liquid is ejected during a run, only from said auxiliary packed column.

6. A method of producing ethyl alcohol of at least about 190 proof from a low-proof wash which contains ethyl alcohol and water and fusel oil, which consists in heating said wash to vaporize said ethyl alcohol and water and fusel oil, passing the mixed vapors of said ethyl alcohol and water and fusel oil upwardly and out of a main fractionating column, condensing a part of said water vapor and substantially all of the vapor of the fusel oil and a part of said ethyl alcohol vapor externally of said main fractionating column to provide a liquid condensate which is returned to said main fractionating column above the point where said mixed vapors enter said main fractionating column, said mixed vapors being cooled in said main fractionating column below their inlet temperature, the liquid condensate which is thus returned to said main fractionating column descending in said main fractionating column in contact with said ascending vapors in said main fractionating column, and separately condensing and collecting the fraction of said water vapor and ethyl alcohol vapor which is kept out of said main column, said mixed vapors which pass out of said main fractionating column being fractionally condensed external to said main fractionating column so that said separately condensed and separately collected fraction is ethyl alcohol of at least about 190 proof, transferring excess condensed liquid from said main fractionating column to an auxiliary fractionating column in which said excess condensed liquid descends, heating said descending liquid in said auxiliary fractionating column to vaporize substantially only the ethyl alcohol thereof, returning the vaporized ethyl alcohol to said main fractionating column to ascend therein, ejecting surplus liquid substantially only from said auxiliary fractionating column.

CARL J. KIEFER.
EDWARD S. MONOHAN.